July 3, 1934.   F. N. BARD   1,964,782
LUBRICATED PLUG VALVE
Filed Aug. 12, 1929
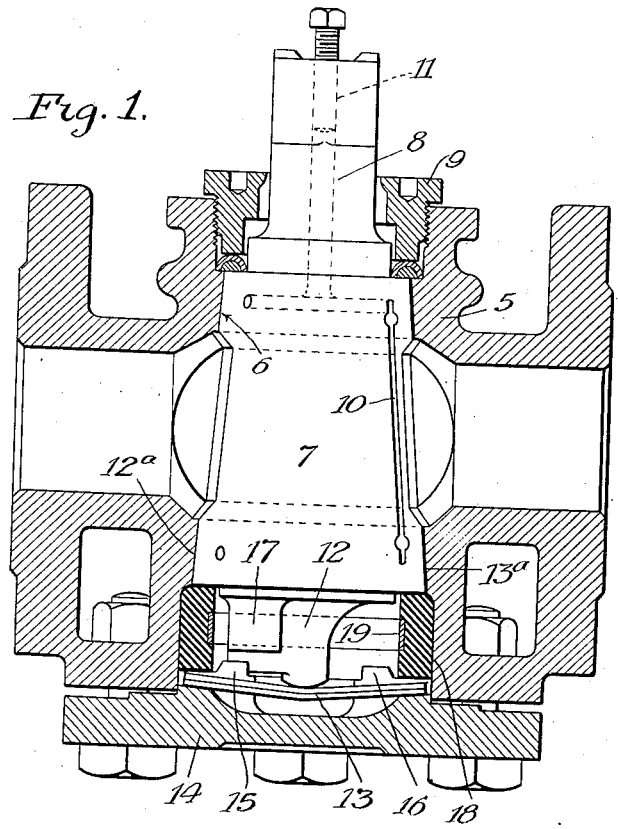
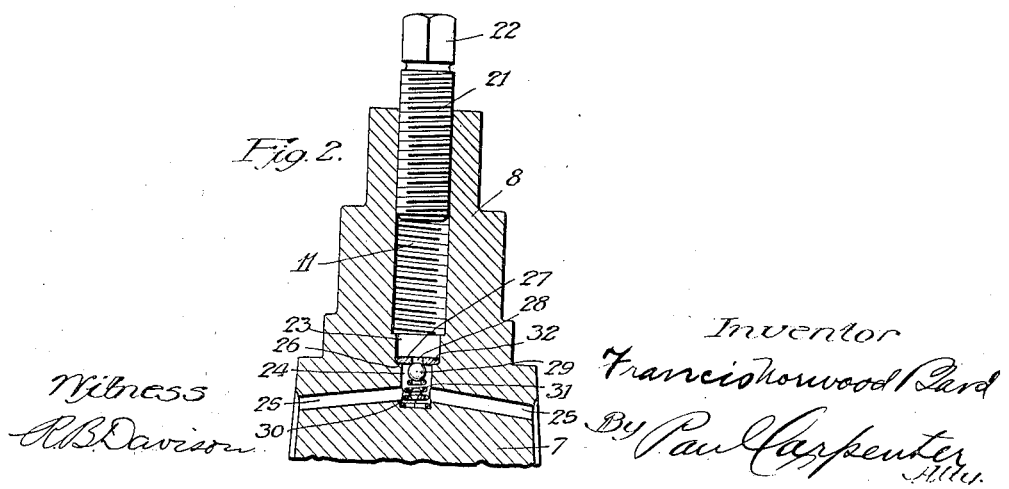

Patented July 3, 1934

1,964,782

UNITED STATES PATENT OFFICE

1,964,782

LUBRICATED PLUG VALVE

Francis Norwood Bard, Highland Park, Ill., assignor to Walworth Patents Inc., Boston, Mass., a corporation of Massachusetts Application August 12, 1929, Serial No. 385,276

7 Claims. (Cl. 251—103)

This invention relates in general to valves, and, more particularly, to valves of the rotatable plug type, the invention being illustrated and described as incorporated in a lubricated plug valve though it will be understood that the invention finds a wide field of utility for other analogous purposes.

This application is in part a continuation of my application Ser. No. 243,995, filed December 31, 1927, now Patent No. 1,911,344, of May 30, 1933.

In the employment of lubricated plug valves, and the like, in conduits containing caustic or acid solutions and wherein, as is not unusual, the plug valve is formed with a tapered valve member and a tapered seat against which said member is engaged under the action of a spring, leakage often occurs either in normal operation or when the plug is lifted from its seat for lubricating purposes permitting the contents of the conduit and the valve to enter the spring chamber and either become solidified therein and hamper the operation of the spring or act chemically on the spring or otherwise to deteriorate the same prematurely. It is, therefore, one of the principal objects of my invention to provide an improved means for employment in plug valves, and the like, for either serving to keep the valve on its seat and to seal off the chamber from the contents of the pipe line, or to provide an auxiliary seal in conjunction with such valves as employ springs in these chambers, a further object of the invention being to provide such an improvement as may be readily installed in plug valves now in use without material alteration in their structures.

A further object of the invention is to provide a yielding sealing member for employment in plug valves, and the like, for excluding the contents of the pipe line from the spring member, if employed, or for acting as a resilient means for holding the valve on its seat and formed of a material which is not readily affected by the fluids passing through the valve and which may come in contact with the device of this invention. This invention has as a further object the provision of an improved means for supplying the lubricant to a lubricated plug valve, more particularly, to an improved check-valve construction for incorporation at one end of the lubricant chamber for preventing reflux of lubricant into the chamber and for relieving the plunger of direct pressure from lubricant contained in the valve so as to eliminate leakage past the plunger and also to permit of refilling of the lubricant chamber without reflux of the lubricant into this chamber occurring; and the provision of a simplified construction of a check-valve permitting the reduction of cost of manufacture by eliminating a number of parts normally employed for this purpose.

The foregoing and such other objects and advantages as may appear or be pointed out as this description proceeds are attained in the structural embodiment of this invention illustrated in the accompanying drawing in which:

Figure 1 is a vertical sectional view of a valve incorporating the improvements of this invention, and Figure 2 is an enlarged fragmentary sectional view showing details of a check-valve construction.

Referring now to the drawing, I provide a valve casing 5, a valve seat 6, a plug valve member 7, the latter having a stem 8 and being constructed substantially in accordance with the form of the invention shown in my original application Ser. No. 243,995 with the exception that a different style of packing is shown. This packing is more particularly described and claimed in my application, Serial No. 130,365, and it will be sufficient to state here that this packing is somewhat yielding in nature so as to cause the valve to be balanced between it and a spring member hereinafter described. A gland 9 retains the packing in position and prevents leakage.

The plug valve member 7 is provided with lubricant grooves 10 and a lubricant chamber 11.

In the form of the invention shown, the bottom of the valve member, that is, the bottom of the plug valve member is provided with a projection 12 which engages a flat spring member 13, the latter being held against rotation on the closure plate 14 by the provision of complemental abutments 15 and 16. The tendency of the spring 13 is to force the valve upwardly by contact with the projection 12 though the valve is susceptible of downward movement, as viewed in Figure 1 under the action of lubricant forced between the valve and its seating surfaces.

The projection 12 here is provided with a lateral enlargement 17 which is adapted to engage one or the other of the abutments 15 and 16 which serve as limit stops, that is, "closure stops" for the valve.

In order to seal the space containing the spring 13 and the projection 12 against ingress of fluids from the conduit or the valve, due to leakage at the points 12a and 13a, I provide an annular sealing member 18 which is formed of a resilient material, this annular sealing member 18 having an internal annular armor 19 which reinforces the member 18 and prevents its undue distortion under pressure. The member 18 extends completely around the bottom of the plug valve member and thus forms an effective seal at the points 12a and 13a and is formed of a material which is not readily susceptible to distortion under the effect of caustic and acid solutions.

It will be observed that in the form of the invention shown, there is a balancing of the valve between the packing at the top of the same and the sealing means at the bottom, and the packing serves as an auxiliary means for keeping the valve on its seat but serves more particularly as a packing at this point. It will further be understood that the form of the invention shown is for employment in a plug valve wherein the valve is held on its seat by the provision of a flat spring, and the sealing means 18 serves as a seal as well as an auxiliary means for tending to return the valve to its seat. It will be understood, of course, that the member 18, or a slight modification thereof, may be employed in the device of my application Ser. No. 243,995 without modifying the spring member usually employed in an arrangement such as that shown in this figure.

It will be observed that the stop member carried by the projection on the bottom of the valve engages the abutments 15 and 16 which hold the flat spring member 13 in position and that this arrangement is not in any way interfered with by the provision of the annular sealing means 18. Furthermore, the same abutments which form stops for the quarter turning of the valve also serve to prevent rotation of the spring member on the closure plate.

Referring now to the lubricated portions of the valve, and the means for supplying lubricant thereto, it will be observed best from Figure 2 that the stem 8 is provided with a lubricant containing internally threaded chamber 20 having arranged therein a threaded cap screw 21 forming a plunger for placing the lubricant contents of the chamber 11 under pressure. The cap screw 21 is provided with a squared head 22 for reception of a suitable tool. The chamber 11 is provided at its bottom with a reduced portion 23 communicating by further reduced portion 24 forming a check-valve chamber with radial passageways 25, 25 which communicate with the grooves 10 formed in the surfaces of contact between the valve and its seat. The reduced portion 24 forms an annular shoulder 26 on which rests an aperture plate 27 having an outlet aperture 28. A ball check-valve 29 lies below the plate 27 and a conical coiled spring 30 tends to hold said ball valve 29 against the underside of the outlet 28 for closing the same. The lower end of the coil spring 30 seats in a recess 31 formed in the body of the valve 7.

In order to retain the plate 27 in position and to eliminate the necessity for threading or for other expensive formations in the valve, the outer peripheral edge of the plate 27 is spun as indicated at 32 to bring the plate into intimate contact with the side wall of the reduced portion 23 of the lubricant chamber. The edges of the metal disc are compressed into the cast iron or other material of the plug and by means of the spinning or punch-press operation the metal of the disc or plate 27 can be extruded into the metal of the valve thus securely retaining the plate 27 in position. Of course, the coil spring and valve member are first deposited into position before the spinning operation. This construction it will be observed, eliminates threading, welding or other expensive methods of holding the disc in position and also eliminates the necessity of employing a separate check-valve unit and making special provision therefor at this point. It will be understood, of course, that if desired, the edges of the plate or disc 27 may be serrated so as to facilitate the distortion by spinning.

Having thus described my invention and illustrated its use, what I claim as new and desire to secure by Letters Patent is:

1. In a device of the character described, in combination, a valve casing having a tapered valve seat, a revoluble plug valve member engaging said seat and having a projection at one end thereof, a chamber in said casing for housing said projection, a spring member lying transversely of the axis of the valve member engaging said projection, a lateral extension on said projection, and means within said chamber for abutment with and adjacent to the ends of said spring and forming stop abutments for said plug valve member.

2. In a device of the character described, in combination, a valve casing having a tapered valve seat, a revoluble plug valve member engaging said seat and having a projection at one end thereof, a chamber in said casing provided with a closing wall for housing said projection wholly therewithin, a spring member in said chamber engaging said projection, a lateral extension on said projection, means within said chamber for retaining said spring and forming stop abutments for said plug valve member, and packing means disposed in said chamber to surround said projection and located adjacent to the joint between the valve and the wall of said chamber for excluding the contents of the valve and pipe line from said chamber.

3. In a valve, a casing having a valve seat, a valve member engaging said seat and terminating short of one end of said casing to form a chamber provided with a closing wall, an annular sealing member lying against the peripheral wall of said chamber and interposed under compression between said closing wall and the adjacent end of the valve member, said sealing member overlying the joint between said valve member and its seat to form a seal, and means arranged within said sealing member for reinforcing the same and preventing its buckling inwardly.

4. In a valve, a casing having a tapered opening therein forming a valve seat, a tapered valve member engaging said seat and being coextensive with said tapered opening, means for yieldingly holding said valve on its seat comprising a spring member engaging one end of said valve and an adjacent part of said casing for seating the valve, and a sealing member disposed beyond the seat engaging the same end of said valve and a part of said casing and tending to seat the same independently of said spring member.

5. In a valve, a casing having a tapered opening therein forming a valve seat, a tapered valve member engaging said seat and being coextensive with said tapered opening, means for yieldingly holding said valve on its seat comprising a metallic spring member engaging one end of said valve and an adjacent part of said casing for seating the valve, and a non-metallic sealing member disposed beyond the seat engaging one end of said valve and the casing and tending to seat the same independently of said spring member.

6. In a device of the character described, in combination, a valve casing having a tapered valve seat open at both ends, a tapered valve member having an operating stem projecting from the smaller end thereof and beyond one end of said seat, a packing for said valve member adjacent to said stem, a chamber in said casing at the larger end of said valve seat, a resilient compressible member in said chamber engaging the wall of said chamber and the larger end of said valve member to seal the joint and to tend to hold the valve member on its seat, a resilient element below said packing in said chamber, and a projection on said valve member engaging said resilient element, abutments on said closure forming limit stops, and a lateral extension on said projection adapted to engage said stops.

7. In a device of the character described, in combination, a valve casing having a tapered valve seat open at both ends, a tapered valve member having an operating stem projecting from the smaller end thereof and beyond one end of said seat, a packing for said valve member adjacent to said stem, a chamber in said casing at the larger end of said valve seat, a resilient compressible member in said chamber engaging the wall of said chamber and the larger end of said valve member to seal the joint and to tend to hold the valve member on its seat, a resilient element below said packing in said chamber, and a projection on said valve member engaging said resilient element, abutments on said closure forming limit stops, said stops serving to hold said resilient element in predetermined position in said chamber, and a lateral extension on said projection adapted to engage said stops.

FRANCIS NORWOOD BARD.